United States Patent [19]
Nelson

[11] Patent Number: 5,894,397
[45] Date of Patent: Apr. 13, 1999

[54] MULTI-PURPOSE PASSIVE SWITCHING DEVICE

[75] Inventor: Keith B. Nelson, Fort Wayne, Ind.

[73] Assignee: Navistar International Transportation Corp., Chicago, Ill.

[21] Appl. No.: 08/762,126

[22] Filed: Dec. 9, 1996

[51] Int. Cl.⁶ .................................................. H01H 47/00
[52] U.S. Cl. ........................... 361/160; 361/104; 361/206
[58] Field of Search ...................................... 361/160, 194, 361/206, 208, 104; 307/119; 340/638

[56] References Cited

U.S. PATENT DOCUMENTS

| | | | |
|---|---|---|---|
| 4,554,607 | 11/1985 | Mora | 361/104 |
| 5,561,580 | 10/1996 | Pounds et al. | 361/104 |

FOREIGN PATENT DOCUMENTS

| | | | |
|---|---|---|---|
| 25 51 447 | 5/1977 | Germany | 361/104 |

OTHER PUBLICATIONS

IBM Technical Disclosure Bulletin, Circuit Condition Indication, Carey et al., vol. 13, No. 3, Aug. 1970.

*Primary Examiner*—Fritz Fleming
*Attorney, Agent, or Firm*—Dennis K. Sullivan; Jeffrey P. Calfa

[57] ABSTRACT

A switching device has a housing containing a magnetic latching relay that operates a set of contacts to respective closed and open conditions. Plural terminals provide for connection of the switching device with controlling circuitry that operates the relay and with controlled circuitry that utilizes the condition of the set of contacts for a control purpose. A thin-line fuse separably mounts on the exterior of the switching device to form a series circuit with the set of contacts between a pair of the terminals that provide connection with the controlled circuitry. The controlling circuitry provides pulse signals to other terminals to operate the relay. The housing further contains a capacitor and LED connected in parallel with the fuse and in series with a resistor so that the LED lights when the fuse is removed or blown. A mechanical override having an external actuator can operate the contacts in the event that they are not operated by the controlling circuitry operating the latching relay.

19 Claims, 1 Drawing Sheet

MULTI-PURPOSE PASSIVE SWITCHING DEVICE

FIELD OF THE INVENTION

This invention relates generally to switching devices, and more particularly to a novel switching device that is especially useful for interfacing electronic controlling circuitry, that typically carries relatively smaller controlling current, with controlled circuitry that typically carries relatively larger current.

BACKGROUND AND SUMMARY OF THE INVENTION

Some electrical control circuits, such as certain automotive vehicle electrical system circuits, utilize an electronic controlling circuit to control the flow of relatively larger current in a controlled circuit. Such a controlled circuit may include an electrically powered device, such as an actuator or a motor for example, that draws much more current than the electronic control circuit can deliver. A switching device for interfacing an electronic controlling circuit with a controlled circuit should: 1) provide low heat generation to avoid potentially damaging thermal effects; 2) possess satisfactory operational reliability over its useful life; and 3) have some form of back-up, or mechanical override, in case of a fault in the electronic controlling circuit. These considerations contribute to expense of employing solid-state relay technology to interface such controlling and controlled circuits.

The present invention relates to a switching device that possesses these features while providing cost-efficient control of electric current switching, especially the switching of larger electrical currents required by certain utilization devices of an automotive vehicle.

One aspect of the present invention relates to a modular form of switching device that comprises a novel configuration of various features in addition to the switching function. The features include: switching by short duration electrical pulses so that the device does not impose continuous current drain in its operational conditions thereby avoiding the generation of significant heat; a circuit protection device, advantageously a thin-line fuse, that separably mounts in circuit-protection-device-receiving-terminals that are mounted on the device to be accessible from the exterior of the device so as to enable the circuit protection device to be mounted, and to be changed when necessary, via the exterior of the switching device; a visible indicator for indicating an open-circuited, or removed, circuit protection device, such as a blown, or removed, thin-line fuse; and an RC circuit that provides for the use of an LED as the indicator while affording certain protection for the LED.

The foregoing, along with further features and advantages of the invention, will be seen in the following disclosure of a presently preferred embodiment of the invention depicting the best mode contemplated at this time for carrying out the invention. The disclosure includes a drawing, now briefly described.

DESCRIPTION OF THE PREFERRED EMBODIMENT

Figure 1:
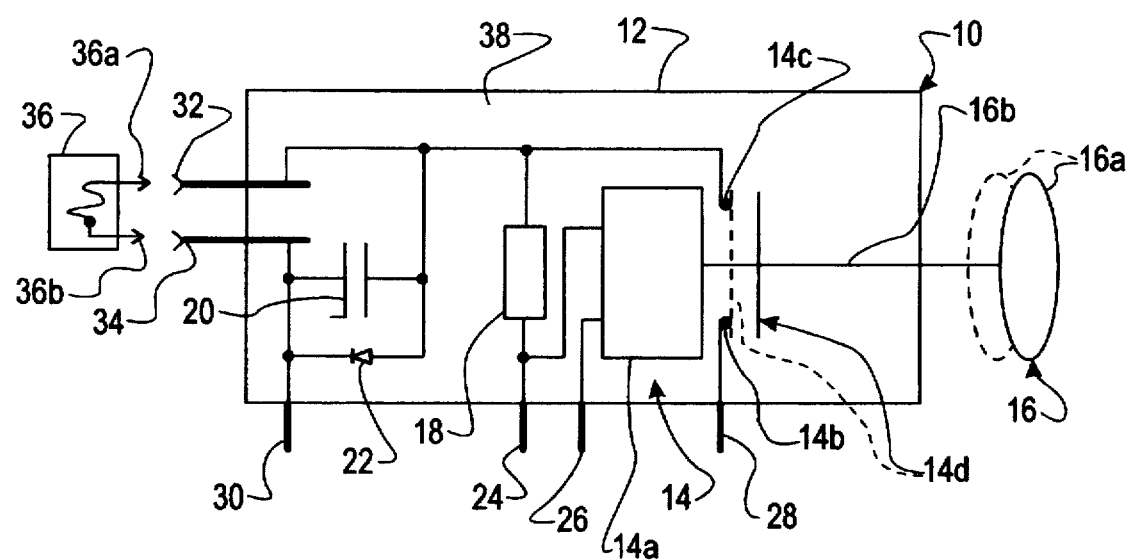
FIG. 1 illustrates, in a generally schematic manner, an exemplary embodiment of switching device embodying principles of the present invention.

FIG. 1 shows an exemplary embodiment of switching device 10 adapted for use with automotive vehicle electrical circuits. Switching device 10 comprises: a walled housing 12; a latching relay 14; a mechanical override 16; a resistor 18, a capacitor 20; an LED (light emitting diode) 22; and six electrical terminals 24, 26, 28, 30, 32, and 34.

Housing 12 comprises an interior 38 that contains latching relay 14, resistor 18, capacitor 20, and LED 22. Terminals 24, 26, 28, 30, 32, and 34 are mounted on housing 12, but are accessible from the exterior of housing 12. Terminals 24, 26 provide for connection of switching device 10 with controlling circuitry (not shown) that operates latching relay 14 to respective latched and unlatched operating conditions. Terminals 28, 30 provide for connection of switching device 10 with controlled circuitry (not shown) that is responsive to the operating condition of relay 14. Terminals 32, 34 provide for separable mounting of a circuit protection device 36 on the exterior of housing 12. (FIG. 1 shows circuit protection device 36 separated from terminals 32, 34 for illustrative convenience.)

Latching relay 14 is preferably a magnetic latching relay that comprises a body 14a and a set of contacts, contacts 14b, 14c, 14d, that is operated by relay 14. The latching relay 14 that is depicted in FIG. 1 is representative of one particular form of latching relay, which has a single coil body 14a, and it is to be appreciated that other forms of relays may be employed in the practice of certain of the inventive principles disclosed herein. Contacts 14b, 14c are fixed contacts while contact 14d is a movable contact that is moved magnetically by the application of current pulses to body 14a.

FIG. 1 shows relay 14 in unlatched condition, causing contact 14d to be in non-bridging relation to fixed contacts 14b, 14c as depicted by the solid line position of contact 14d, and hence causing the set of contacts to be open. When relay 14 is in latched condition, depicted by the broken line position of contact 14d in FIG. 1, contact 14d is bridging contacts 14b, 14c, thereby operating the set of contacts closed.

Interior of housing 12: terminals 24, 26 are connected to relay body 14a; terminal 28 is connected in common with fixed contact 14b; terminal 32 is connected in common with fixed contact 14c; and terminals 30 and 34 are connected in common. Resistor 18, capacitor 20, and LED 22 are conventional electrical components each of which has two leads extending from it to form terminations via which the component may be connected in an electric circuit. Capacitor 20 and LED 24 are connected in mutually parallel circuit relationship within housing 12 via their leads, and this parallel combination is connected across terminals 32 and 34. One lead of resistor 18 is connected in common with terminal 24, and the other lead of resistor 18 is connected in common with fixed contact 14c and terminal 32. This configuration places resistor 18 and capacitor 20 in an RC series circuit between terminals 24 and 30, with LED 22 shunting capacitor 20.

Circuit protection device 36 is, by way of example, a thin-line fuse having terminals 36a, 36b for separable mating connection with terminals 32 and 34 respectively. With terminals 32 and 36a mated, and with terminals 34 and 36b mated, circuit protection device 36 and the set of relay contacts are placed in series circuit relationship between terminals 28 and 30. LED 22 and capacitor 20 are also placed in parallel with circuit protection device 36. With relay 14 in the unlatched condition depicted by solid lines, this series circuit is open; with relay 14 in the latched condition depicted by broken lines, this series circuit is closed.

Switching device 10 is operatively connected with a controlling circuit by connecting the controlling circuit in circuit with terminals 24 and 26. Switching device 10 is operatively connected with a controlled circuit by connecting the controlled circuit in circuit with terminals 28 and 30. With the relay in latched condition, the completed circuit between terminals 28 and 30 provides a path for controlled current to flow in the controlled circuit; with the relay in unlatched condition, the circuit between terminals 28 and 30 is open, blocking the path for controlled current to flow in the controlled circuit thereby preventing the flow of controlled current flow in the controlled circuit.

One manner of connecting device 10 with controlling and controlled circuits is shown in FIG. 1. Terminal 24 is connected to +12VDC, and terminal 26 is connected to a trigger output of the controlling circuit. Terminal 30 is connected to ground, and terminal 28 is connected to the controlled circuit. When the operating condition of relay 14 is to be changed from one condition to the other, a ground is momentarily applied to terminal 26. This delivers a current pulse to relay body 14a, causing relay 14 to switch from one operating condition to the other.

Thus, when relay 14 is in unlatched condition, its contacts are open, and so no current path from the controlled circuit to ground is provided through device 10. If a pulse is now applied to relay body 14a, the relay operates to latched condition, completing a current path, that comprises contacts 14b, 14d, 14c and circuit protection device 36, from the controlled circuit to ground. Controlled current now flows through this path.

So long as the controlled current does not exceed the rating of circuit protection device 36, controlled current can flow through device 10 whenever relay 14 is in its latched operating condition. Because circuit protection device 36 provides essentially no resistance, it shorts both capacitor 20 and LED 22 in both operating conditions of relay 14. Should the controlled current exceed the rating of circuit protection device 36, it will open to stop the overload, and thence will cease to short capacitor 20 and LED 22. Current now flows from terminal 24, through resistor 18, capacitor 20, and LED 22 to ground. Resistor 18 and capacitor 20 form an RC series circuit wherein capacitor 20 will charge to a voltage that is determined by the relative resistances of resistor 18 and LED 22. Resistor 18 is selected to provide proper operating voltage for LED 22 so that when charge current through capacitor 20 ceases, the voltage across capacitor 20 and LED 22 equals the rated operating voltage for LED 22 thereby illuminating the LED. A further effect of capacitor 20 is to provide some degree of surge protection for LED 22 since the voltage across a capacitor cannot change instantaneously. When circuit protection device 36 is disconnected from terminals 32, 34, failure of LED 22 to illuminate can indicate a fault either in the external controlling circuit or in internal parts of device 10 associated with the controlling circuit.

LED 22 is mounted within housing 12 to be visible from the exterior of the housing. Mounting of LED 22 for external visibility may be accomplished in different ways. Housing may have a window allowing viewing of the LED, or the LED may be mounted in a opening in the housing wall. Illumination of LED 22 indicates a fault due either to a current overload detected by device 36 or to removal of device 36 from its mounting on housing 12.

Override 16 provides for manual operation of movable contact 14d. Override 16 comprises an external knob 16a to which a shaft 16b is attached. Shaft 16b extends from knob 16a, through housing 12, and into interior 38 and operative association with contact 14d. In the unlatched condition of the relay, knob 16a may be pushed from the solid line position toward housing 12, pushing shaft 16b into interior 38 to force contact 14d into bridging relationship with contacts 14b, 14c. In the latched condition of the relay, knob 16a may be pulled from the broken line position away from housing 12, pulling shaft 16b outward of interior 38 to break contact 14d from contacts 14b, 14c.

A device embodying principles of the present invention may be fabricated in configurations different from the example that has been illustrated and described. For example, one form may operate relay 14 from unlatched condition to latched condition by application of one polarity pulse while operation of the relay from latched condition to unlatched condition may be accomplished by application of an opposite polarity pulse. Alternatively (and not specifically depicted in the drawing FIGURE), relay body 14a may comprise dual coils, one of which is pulsed to operate relay 14 from unlatched condition to latched condition and the other of which is pulsed to operate relay 14 from latched condition to unlatched condition. An important attribute if using a magnetic latching relay is that the body 14a containing the coil, or coils, does not draw continuous current, thereby minimizing heat generation.

Mechanical override 16 can be arranged to operate other than with straight line motion (a toggle, for example). Although circuit protection device is advantageously mounted on the exterior of housing 12, it could be mounted within interior 38, but the latter location might be more difficult to service. The exterior of housing 12 can be designed with a cavity in the form of a fuse block receptacle containing terminals 32, 34 to receive circuit protection device 36.

In usage of a switching device 10 in an automotive vehicle, knob 16a may be advantageously placed for convenient access by the driver, such as mounting the device behind the instrument panel while shaft 16b protudes through a hole to knob 16a.

While a presently preferred embodiment of the invention has been illustrated and described, it should be appreciated that principles of the invention are applicable to all embodiments that fall within the scope of the following claims.

What is claimed is:

1. A switching device comprising:
   a) a latching relay that is selectively operable to a latched operating condition and to an unlatched operating condition respectively by applying respective latch and unlatch signals to said relay;
   b) said latching relay comprising a set of contacts that assumes respective closed and open conditions corresponding to respective operating conditions of said latching relay;
   c) plural terminals providing for connection of the switching device with controlling circuitry that operates said latching relay to its respective operating conditions and with controlled circuitry that utilizes the condition of said set of contacts for a control purpose;
   d) a circuit protection device comprising a pair of terminals;
   e) said switching device further comprising a pair of circuit-protection-device-receiving-terminals to which said pair of terminals of said circuit protection device are respectively separably connected to place said circuit protection device between said pair of circuit-protection-device-receiving-terminals; and f) means placing said circuit protection device in series with said set of contacts between a pair of said plural terminals that provide for connection of said set of contacts and said circuit protection device in series circuit relationship with controlled circuitry that utilizes the condition of said set of contacts for a control purpose.

2. A switching device as set forth in claim 1 in which said latching relay comprises a magnetic latching relay, and said set of contacts is open when said magnetic latching relay is in unlatched operating condition and closed when said magnetic latching relay is in latched operating condition.

3. A switching device as set forth in claim 2 further including a mechanical override for forcing said set of contacts from one of its respective conditions to the other of its respective conditions.

4. A switching device as set forth in claim 3 further including a housing having an interior within which said magnetic latching relay and said set of contacts are contained, and said mechanical override comprises a manual actuator accessible from exterior of said housing and extending into the interior of said housing for forcing said set of contacts from one of its respective conditions to the other of its respective conditions.

5. A switching device as set forth in claim 4 in which said manual actuator is operable along a straight line for pushing toward said housing when said set of contacts is open to cause said set of contacts to close, and pulling away from said housing when said set of contacts is closed to cause said set of contacts to open.

6. A switching device as set forth in claim 1 further including a housing having an interior within which said latching relay and said set of contacts are contained, and in which said pair of circuit-protection-device-receiving-terminals are accessible from exterior of said housing to provide for said pair of terminals of said circuit protection device to be separably connected to said pair of circuit-protection-device-receiving-terminals from the exterior of said housing to separably connect said circuit protection device across said pair of circuit-protection-device-receiving-terminals.

7. A switching device as set forth in claim 6 further including an electrically operable indicator that is visible from exterior of said housing, and means connecting said indicator in circuit across said pair of circuit-protection-device-receiving-terminals to thereby place said indicator in parallel circuit relationship with said circuit protection device.

8. A switching device as set forth in claim 7 further including a capacitor, means connecting said capacitor in parallel circuit relationship with said indicator, a resistor comprising a pair of terminals, and means connecting one of said resistor terminals in common with one of said pair of circuit-protection-device-receiving-terminals and connecting said resistor in series circuit relationship with said indicator and capacitor.

9. A switching device as set forth in claim 8 in which said indicator comprises an LED.

10. A switching device as set forth in claim 8 including means connecting one of said pair of said plural terminals that provide for connection of said set of contacts and said circuit protection device in series circuit relationship with controlled circuitry that utilizes the condition of said set of contacts for a control purpose in common with the other of said pair of circuit-protection-device-receiving-terminals.

11. A switching device as set forth in claim 10 further including means connecting the other of said resistor terminals in common with one of said plural terminals providing for connection of the switching device with controlling circuitry that operates said latching relay to its respective operating conditions.

12. A switching device as set forth in claim 1 in which said circuit protection device comprises a thin-line fuse.

13. A switching device comprising:
a) a magnetic latching relay that is selectively operable to a first operating condition and to a second operating condition respectively;
b) said relay comprising a set of contacts that selectively assumes respective closed and open conditions corresponding to respective operating conditions of said relay;
c) plural terminals providing for connection of the switching device with controlling circuitry that operates said relay to its respective operating conditions and with controlled circuitry that utilizes the condition of said set of contacts for a control purpose;
d) a circuit protection device;
e) means placing said circuit protection device in series with said set of contacts between a pair of said plural terminals;
f) a capacitor;
g) an indicator; and
h) means placing said capacitor and indicator in parallel circuit relationship with said circuit protection device.

14. A switching device as set forth in claim 13 in which said circuit protection device comprises a pair of terminals, and said switching device comprises a pair of circuit-protection-device-receiving-terminals to which said pair of terminals of said circuit protection device are respectively separably connected to place said circuit protection device between said pair of circuit-protection-device-receiving-terminals.

15. A switching device as set forth in claim 14 further including a resistor comprising a pair of terminals, means connecting one of said resistor terminals in common with one of said pair of circuit-protection-device-receiving-terminals and connecting said resistor in series circuit relationship with said indicator and capacitor, means connecting one of said pair of said plural terminals that provide for connection of said set of contacts and said circuit protection device with controlled circuitry that utilizes the condition of said set of contacts for a control purpose in common with the other of said pair of circuit-protection-device-receiving-terminals, and means connecting the other of said resistor terminals in common with one of said plural terminals providing for connection of the switching device with controlling circuitry that operates said relay to its respective operating conditions.

16. A switching device comprising:
a) plural terminals providing for connection of the switching device with controlling circuitry and controlled circuitry;
b) a latching relay that is selectively operable to a latched operating condition and to an unlatched operating condition respectively;
c) said latching relay comprising a set of contacts that assumes respective closed and open conditions corresponding to respective operating conditions of said latching relay;
d) a first set of said plural terminals providing for connection of said latching relay with controlling circuitry that operates said latching relay to its respective operating conditions;

e) a circuit protection device;

f) means placing said circuit protection device in series with said set of contacts between terminals of a second set of said plural terminals that provide for connection of said set of contacts and said circuit protection device in series circuit relationship with controlled circuitry that utilizes the condition of said set of contacts for a control purpose;

g) a resistor comprising a pair of terminals;

h) a capacitor;

i) means placing said capacitor in parallel circuit relationship with said circuit protection device; and j) means connecting one of said resistor terminals in common with one of said first set of terminals and connecting the other of said resistor terminals to place said resistor in series circuit relationship with said capacitor and said circuit protection device.

17. A switching device as set forth in claim 16 further including an electrically operable indicator, and means placing said indicator in parallel circuit relationship with said capacitor and said circuit protection device.

18. A switching device as set forth in claim 17 in which said circuit protection device comprises a pair of terminals and said switching device further comprises a pair of circuit-protection-device-receiving-terminals to which said pair of terminals of said circuit protection device are respectively separably connected to place said circuit protection device between said pair of circuit-protection-device-receiving-terminals.

19. A switching device as set forth in claim 16 further including a housing having an interior within which said latching relay and said set of contacts are contained, and a mechanical override for forcing said set of contacts from one of its respective conditions to the other of its respective conditions comprising a manual actuator accessible from exterior of said housing and extending into the interior of said housing for forcing said set of contacts from one of its respective conditions to the other of its respective conditions.

* * * * *